United States Patent
Lenkl

(10) Patent No.: US 8,434,540 B2
(45) Date of Patent: May 7, 2013

(54) CONFIGURABLE MODULAR LABELING MACHINE AND METHODS OF MAKING SAME

(75) Inventor: Johannes S. Lenkl, Freising (DE)

(73) Assignee: Avery Dennison Corporation, Pasadena, CA (US)

( * ) Notice: Subject to any disclaimer, the term of this patent is extended or adjusted under 35 U.S.C. 154(b) by 588 days.

(21) Appl. No.: 12/100,553

(22) Filed: Apr. 10, 2008

(65) Prior Publication Data

US 2009/0255633 A1 Oct. 15, 2009

(51) Int. Cl.
*B65B 51/06* (2006.01)

(52) U.S. Cl.
USPC ............ 156/556; 156/60; 156/212; 156/247; 156/249; 156/351; 156/352; 156/361; 156/362; 156/363; 156/387; 156/475; 156/486; 156/487; 156/492; 156/541; 156/542; 156/566; 156/583.1; 156/DIG. 2; 156/DIG. 25; 156/DIG. 27; 156/DIG. 28; 156/DIG. 29; 156/DIG. 37; 156/DIG. 39

(58) Field of Classification Search .................... 156/60, 156/212, 247, 249, 351, 352, 361, 362, 363, 156/387, 475, 486, 487, 492, 541, 542, 556, 156/566, 583.1, DIG. 2, DIG. 25, DIG. 27, 156/DIG. 28, DIG. 29, DIG. 37, DIG. 39
See application file for complete search history.

(56) References Cited

U.S. PATENT DOCUMENTS

| | | | |
|---|---|---|---|
| 4,032,386 A | 6/1977 | Fleet | |
| 4,390,390 A | 6/1983 | Margraf et al. | |
| 4,574,027 A | 3/1986 | Weinundbrot | |
| 4,624,734 A | 11/1986 | Voltmer et al. | |
| 4,787,953 A | 11/1988 | Trouteaud et al. | |
| 5,264,066 A | 11/1993 | Lundell | |
| 5,421,948 A | 6/1995 | Crankshaw et al. | |
| 5,472,552 A | 12/1995 | Speranza et al. | |
| 5,645,669 A | 7/1997 | Crankshaw et al. | |
| 5,676,298 A * | 10/1997 | Shing-Tak Lam | 226/88 |
| 5,725,721 A * | 3/1998 | Yeh | 156/468 |
| 5,853,530 A | 12/1998 | Allen | |
| 6,352,094 B1 | 3/2002 | Gunderson et al. | |
| 6,412,535 B1 | 7/2002 | Barilovits et al. | |
| 6,913,662 B2 | 7/2005 | Barilovits et al. | |
| 7,252,131 B2 | 8/2007 | Draghetti et al. | |
| 2004/0074582 A1* | 4/2004 | Davis et al. | 156/64 |
| 2005/0236112 A1 | 10/2005 | Barilovits et al. | |

FOREIGN PATENT DOCUMENTS

| | | |
|---|---|---|
| DE | 4217655 | 2/1993 |
| EP | 0370633 | 5/1990 |
| EP | 0506597 | 9/1992 |
| EP | 0980832 | 2/2000 |
| JP | 401048752 | 2/1989 |
| JP | 2002059056 | 2/2002 |
| JP | 2004262520 | 9/2004 |
| JP | 2004352256 | 12/2004 |
| WO | WO9308081 | 4/1993 |

* cited by examiner

*Primary Examiner* — Kat Wyrozebski
*Assistant Examiner* — Joshel Rivera
(74) *Attorney, Agent, or Firm* — Avery Dennison Corporation

(57) ABSTRACT

There is disclosed a configurable modular labeling machine and a method of making same. The machine can be selectively assembled in a number of different configurations. The machine has a frame or housing that can mount selectively positionable applicator and rewind modules. The applicator module includes a plate that can carry direction-changing and feed rolls and can mount a dispensing mechanism. The rewind module can include a plate that can mount direction-changing rolls and a rewind.

13 Claims, 18 Drawing Sheets

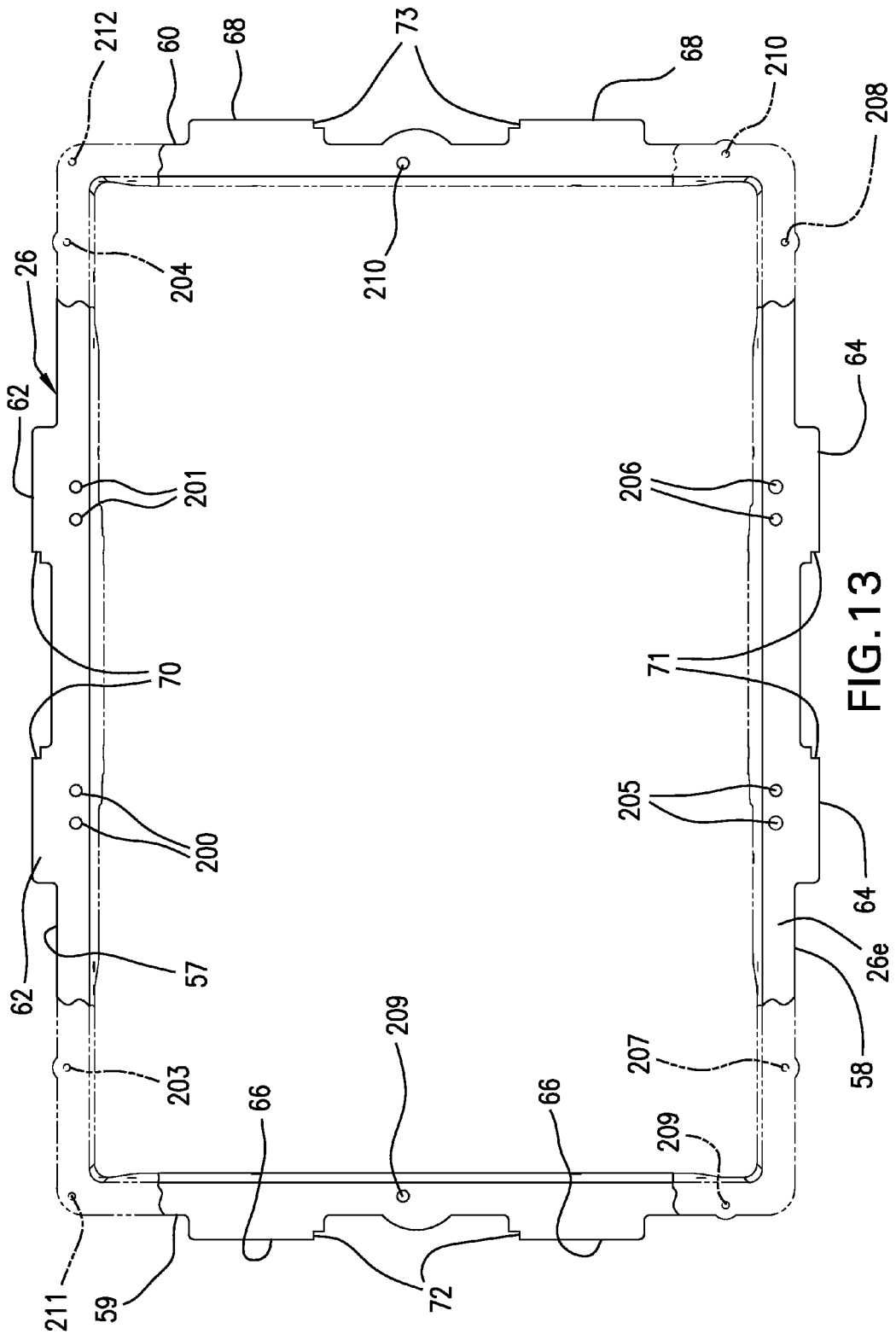

CONFIGURABLE MODULAR LABELING MACHINE AND METHODS OF MAKING SAME

CROSS-REFERENCE TO RELATED APPLICATIONS

Reference is hereby made to co-owned pending U.S. patent application Ser. No. 11/323,304, filed Dec. 30, 2005, Publication No. US2007/0125899; and U.S. patent application Ser. No. 11/323,326 filed Dec. 30, 2005, Publication No. US2007/0131814; these applications and their disclosures are incorporated herein by reference in their entireties.

BACKGROUND

1. Field

The field relates to labeling machines and methods of making same.

2. Brief Description of the Prior Art

The following may be prior art: U.S. Pat. Nos. 4,032,386; 4,390,390; 4,574,027; 4,624,734; 4,787,953; 5,264,066; 5,421,948; 5,645,669; 5,472,552; 5,853,530; 6,352,094; 6,412,535; 6,913,662; 7,252,131; U.S. Publication No. 2005/0236112; WO93/08081; EP 370633 A1; EP 506597 A1; EP 980832 A1; DE 4217655 A1; JP 1-48752 A1; JP 2002-59056 A1; JP-2004-262520 A1; JP 2004-352256 A1; and Avery Dennison User Manual ALS204/206,256 Editions 2006 and 2007.

SUMMARY

An embodiment relates to a labeling machine can include a housing defining a space capable of mounting at least one module, an arm having an arm portion capable of holding a label supply roll and having a base portion, the arm portion being oblique to the base portion, one of the housing and the base portion having spaced apart first locating surfaces and the other of the housing and the base portion having a second locating surface cooperable with either one of the first locating surfaces in either one of two positions. It is preferred that the housing has spaced exterior flat first surfaces and the base portion has spaced flat second surfaces, wherein the base portion and the housing are capable of being secured with their first and second flat surfaces in contact with each other. It is preferred that a label applicator module is mounted in the space. It is preferred that a rewind module is mounted in the space.

An embodiment of a labeling machine can include a housing defining internal space, the housing having at least two external mounting stations, and a label roll mounting arm capable of being mounted at any one of the mounting stations. It is preferred that the arm extend obliquely with respect to the housing. It is preferred that the housing is generally rectangular and has an external mounting station on all four sides and at the rear side. It is preferred that the housing has a mounting station on each of at least two sides. It is preferred that each mounting station include at least one aligning surface and the arm include a cooperable aligning surface.

An embodiment of a labeling machine can include an arm for mounting a label roll, the arm including an arm portion and a base portion extending obliquely with respect to each other, and at least one aligning surface on the base portion. It is preferred that the arm can be of one-piece molded or cast construction. It is preferred that the base portion can have flat mounting surfaces at opposite sides of the aligning surface. It is preferred that a web guide can be mounted on the arm.

An embodiment of a method of making a labeling machine can include providing a housing defining space capable of mounting at least one module, and an arm having an arm portion capable of holding a label supply roll and having a base portion, the arm portion being oblique to the base portion, one of the housing and the base portion having opposed spaced-apart first locating surfaces and the other of the housing and the base portion having a second locating surface cooperable with either one of the first locating surfaces in either one of two positions, selectively positioning the arm in either one of the two positions on the housing, and securing the positioned arm to the housing in the selected position.

An embodiment of a method of making a labeling machine can include providing a housing defining a space capable of mounting at least one assembly, at least two external mounting stations on the housing, and an arm capable of mounting a label supply roll, and selectively mounting the arm at any of the mounting stations.

An embodiment of a labeling machine can include a frame defining interior space, a mounting plate disposed in the interior space, at least one roll mounted on the plate and helping to define a path for a label-carrying web, at least two alternative mounting locations to mount the plate, a label dispenser, at least two alternative mounting locations to mount the dispenser, wherein the roll(s) and the dispenser are capable of being mounted at the selected locations corresponding to the predetermined direction from which labels are to be dispensed with respect to the frame. It is preferred that the mounting plate can be a rewind mounting plate. It is preferred that an arm mounts a label supply roll, and that there is at least one mounting location to mount the arm to extend in one of two different directions.

An embodiment of a labeling machine can preferably include a frame having a configuration generally in the form of a rectangle and having an inside defining space to receive components of a labeling machine, the frame having an outside with selective mounting locations for a labeling machine component on any one or more of at least three sides of the rectangle.

An embodiment of a labeling machine can preferably include a housing defining interior space, a first module removably mounted in the interior space, wherein the first module includes at least one driven roll capable of advancing a web of labels, and a label dispenser capable of dispensing labels from the web along a web path, a second module removably mounted in the interior space, and the second module being capable of rewinding the spent web. It is preferred that the second module include a rewind plate and a motor-driven rewind hub mounted on the rewind plate, and wherein the rewind plate is mounted in the housing in a first orientation for left-hand operation and in a second orientation for right-hand orientation. It is preferred that the label dispenser is attached to the first module. It is preferred that the locations of the first and second modules within the interior space of the housing can be reversed. It is preferred that the interior space has side-by-side first and second locations, and wherein the first module and the second module can be respectively positioned at the first and second locations, or vice versa. It is preferred that the first module have a first driven roll upstream of the label dispenser and a second driven roll downstream of the label dispenser, and wherein the driven rolls are disposed along the web path. It is preferred that an arm is capable of mounting a label supply roll, and at least one mounting location on the housing capable of mounting the arm to extend in one of two different directions. It is preferred that the first module have a first mounting plate secured to the housing, the second module have a second mounting plate secured to the housing, each of the first and second frames can be positioned either in one position or in another position 180 degrees with respect to the one position, and the positions of the first and second base plates in the interior space can be reversed. It is preferred to provide a support arm capable of supporting a label web supply roll, wherein the housing has an exterior with at least two different mounting stations, wherein the support arm is positionable at any mounting station. It is preferred that the housing is generally rectangular, and the first and second modules are secured in side-by-side relationship within the interior space. It is preferred that the interior space is sized to accept a print engine.

An embodiment of a method of making a labeling machine can include providing a housing defining interior space having first and second locations, a dispenser capable of dispensing labels from a label web, wherein the first module includes at least one driven feed roll capable of feeding a label-carrying web from a web supply roll to the dispenser, and a second module including a driven hub capable of winding the spent web into a roll, and selectively positioning the first module at either the first location or the second location and positioning the second module at the remaining location. It is preferred to include the step of positioning a label supply roll at a selected location in dependence on the positions of the first and second modules. It is preferred to include positioning the label dispenser at a selected location in dependence on the location of the first and second modules. It is preferred to include positioning a label supply roll at a selected location in dependence on the positions of the first and second modules. It is preferred to include providing a tension control device, and orienting the tension control device in different positions to provide a tensioned web from a web supply roll to the label dispenser.

BRIEF DESCRIPTION OF THE DIAGRAMMATIC DRAWINGS

FIG. 13 is a fragmentary front elevational view of the frame shown in FIG. 11 for example;

Figure 20:
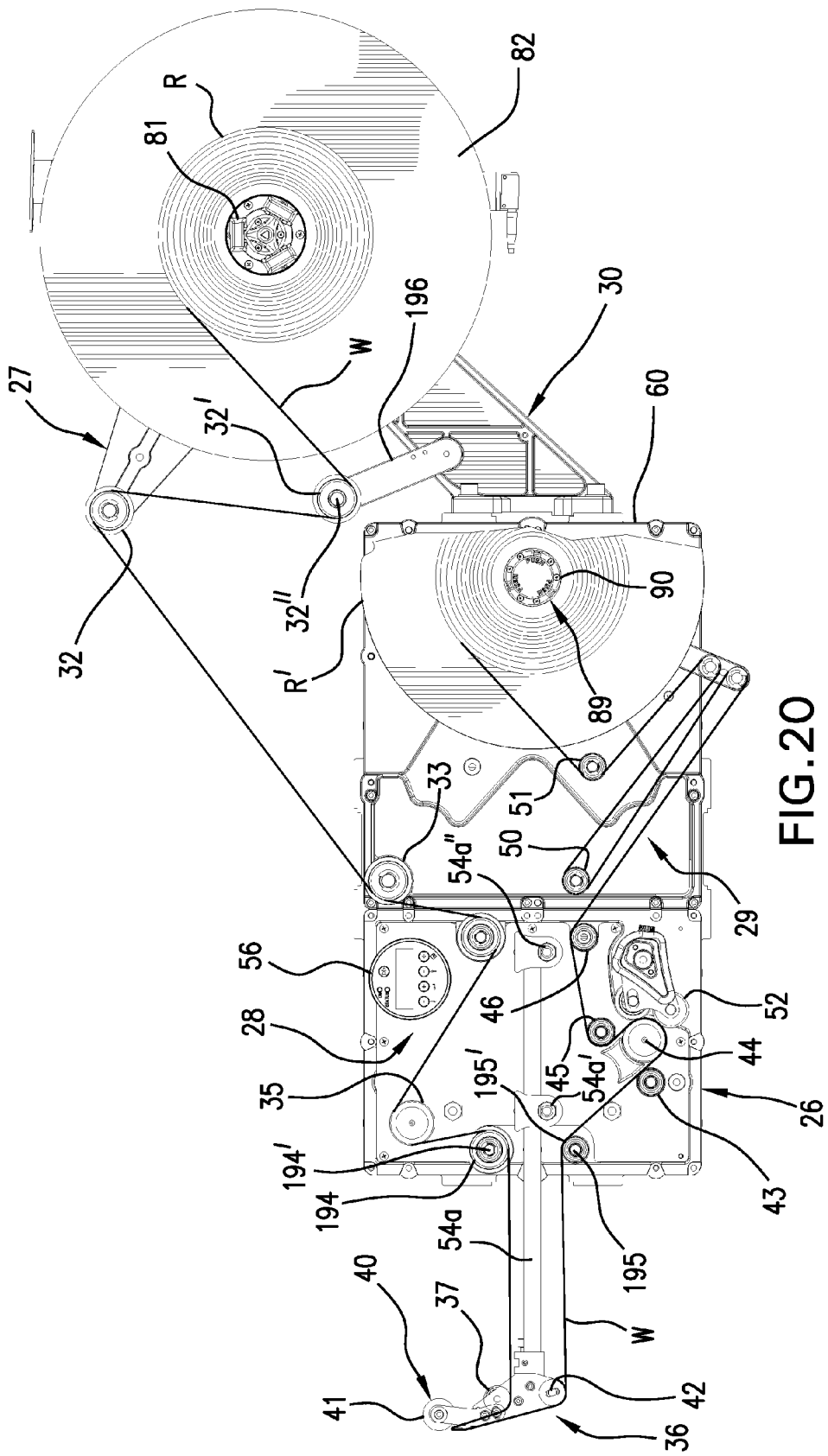
Figure 21:
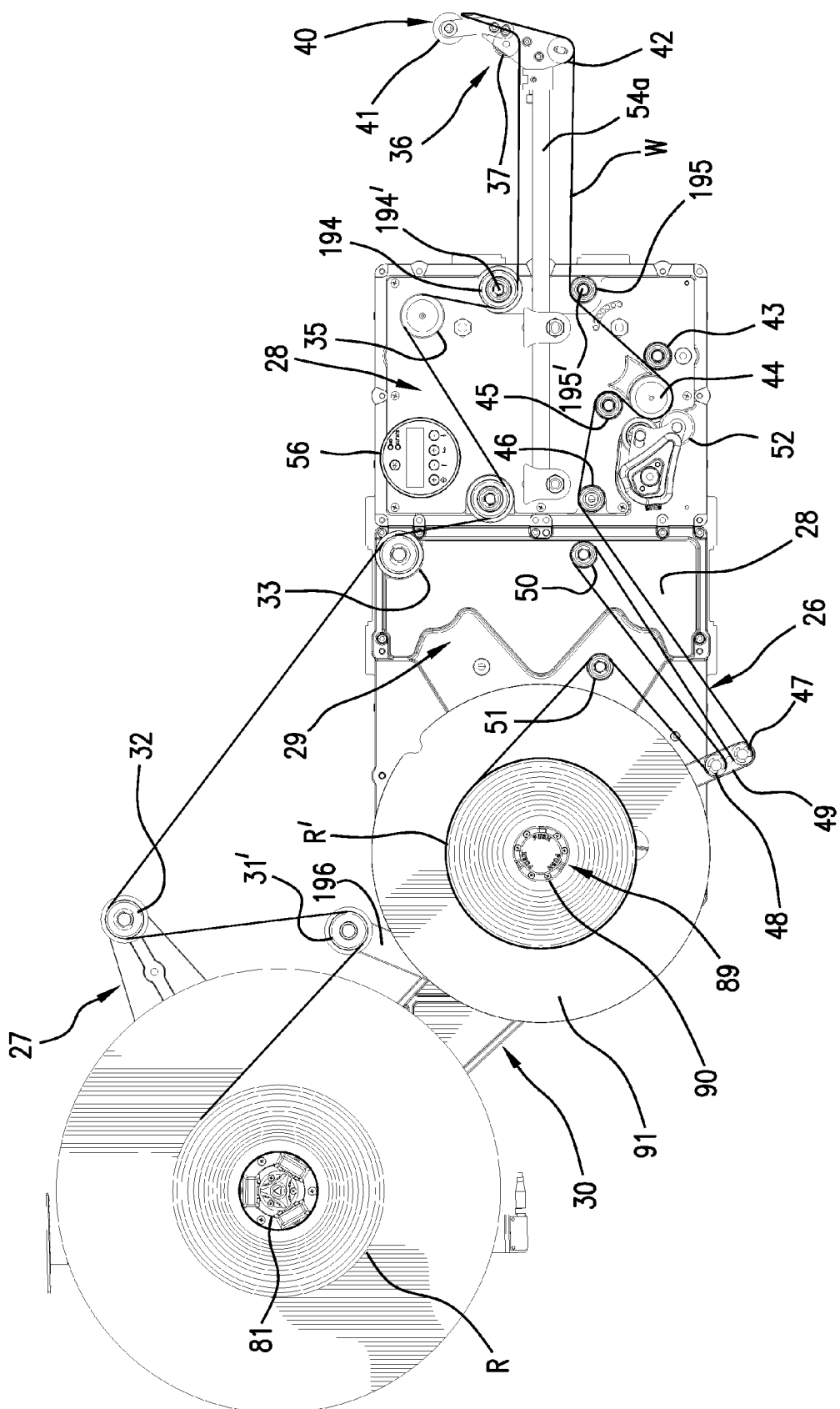

FIG. 20 is a front elevational view of the labeling machine assembled in accordance with still another selected configuration which may be called a low-profile left-hand or generally triangular configuration; and FIG. 21 is a front elevational view of the labeling machine assembled in accordance with yet another selected configuration which may be called a low-profile or generally triangular right-hand configuration.

DETAILED DESCRIPTION OF THE PREFERRED EMBODIMENTS

Figure 18:
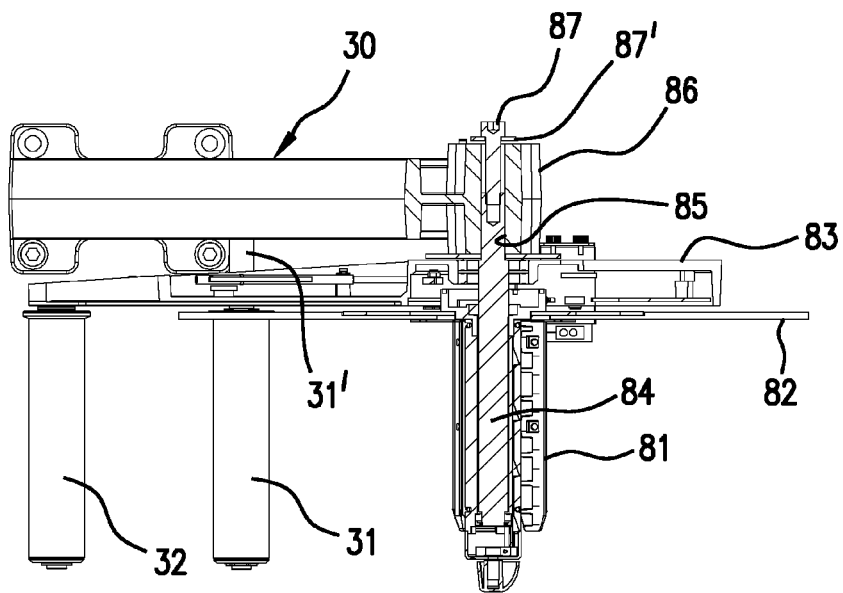
FIG. 18 is a sectional view taken generally along line 18-18 of FIG. 17.
Figure 19:
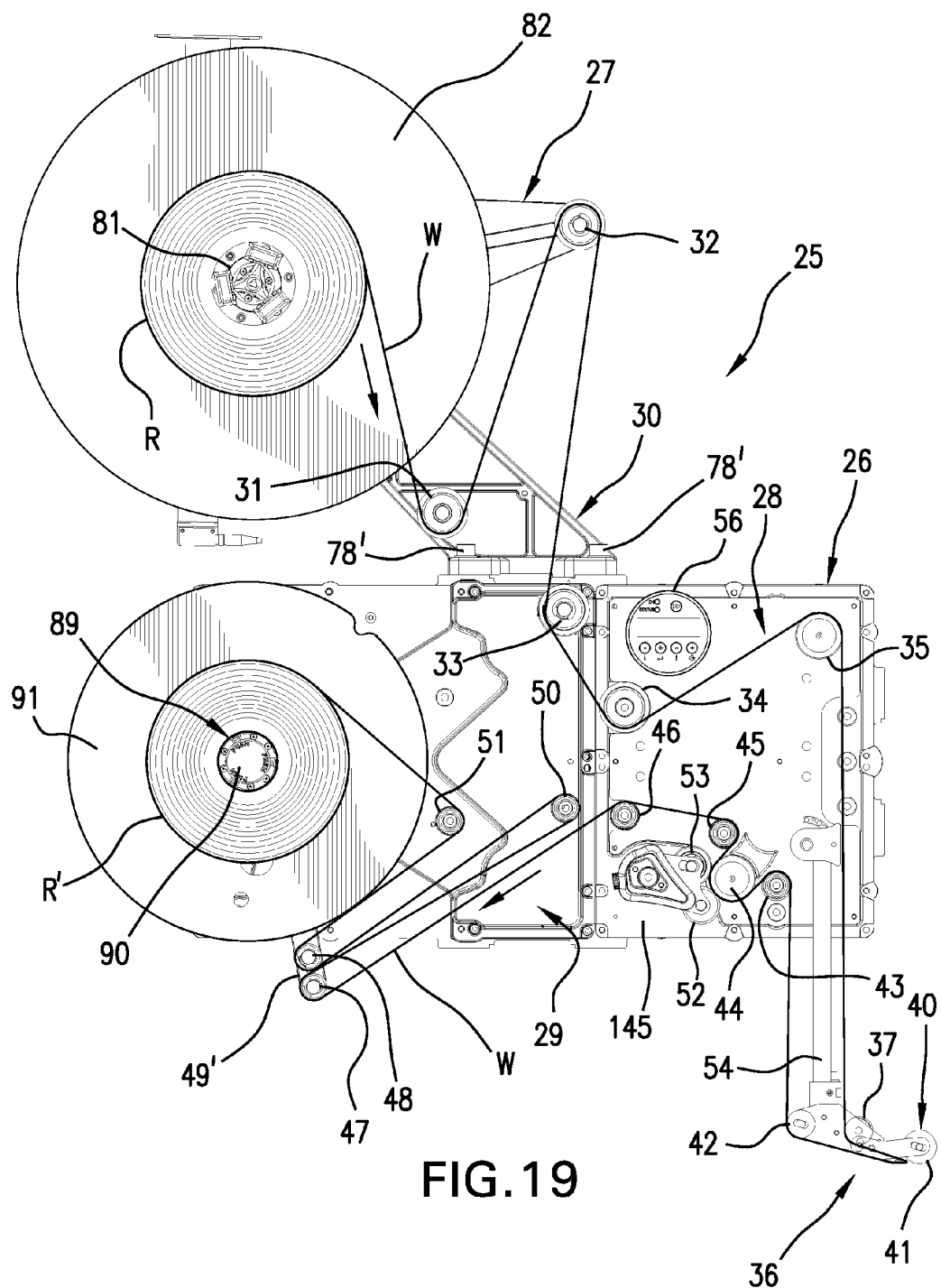
FIG. 19 is a front elevational view of the labeling machine assembled in accordance with another selected configuration which may be called a right-hand configuration.

The embodiment of FIGS. 1 through 18 depicts a configuration of a labeling machine generally indicated at 25, while each of FIGS. 19 through 21 depicts a different configuration. The configurations depicted in FIGS. 1 through 18 and in FIG. 20 may be referred to as left-hand configurations. The labeling machine 25 enables pressure sensitive labels L (only two of which are shown in FIG. 2) to be dispensed from a web W and applied to an object such as a container (not shown). The machine 25 may be mounted in position to apply labels L for example to the objects moving on a conveyor (not shown).

Figure 1:
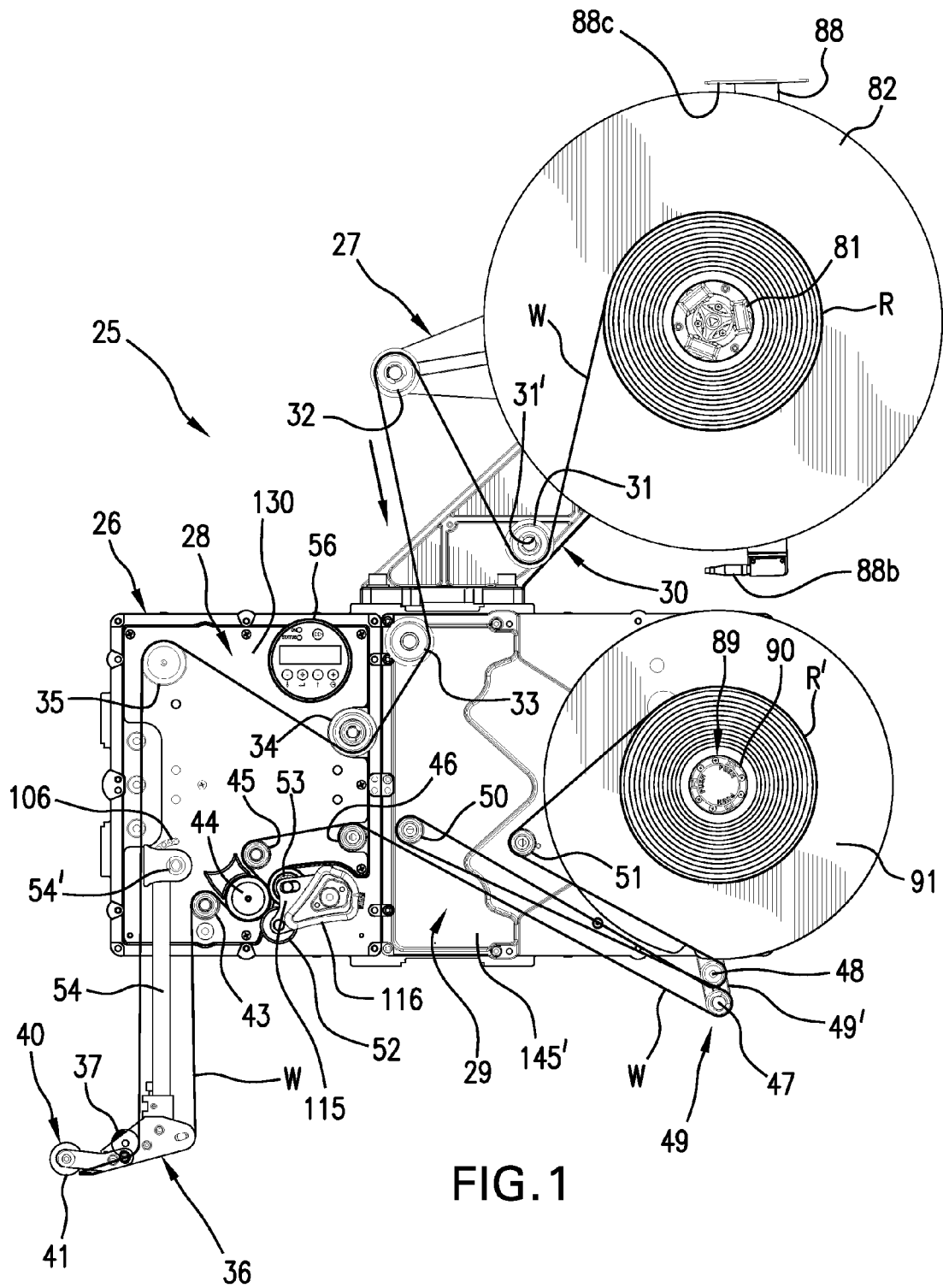
FIG. 1 is a front elevational view of a labeling machine assembled in accordance with one selected configuration which may be called a left-hand configuration.
Figure 2:
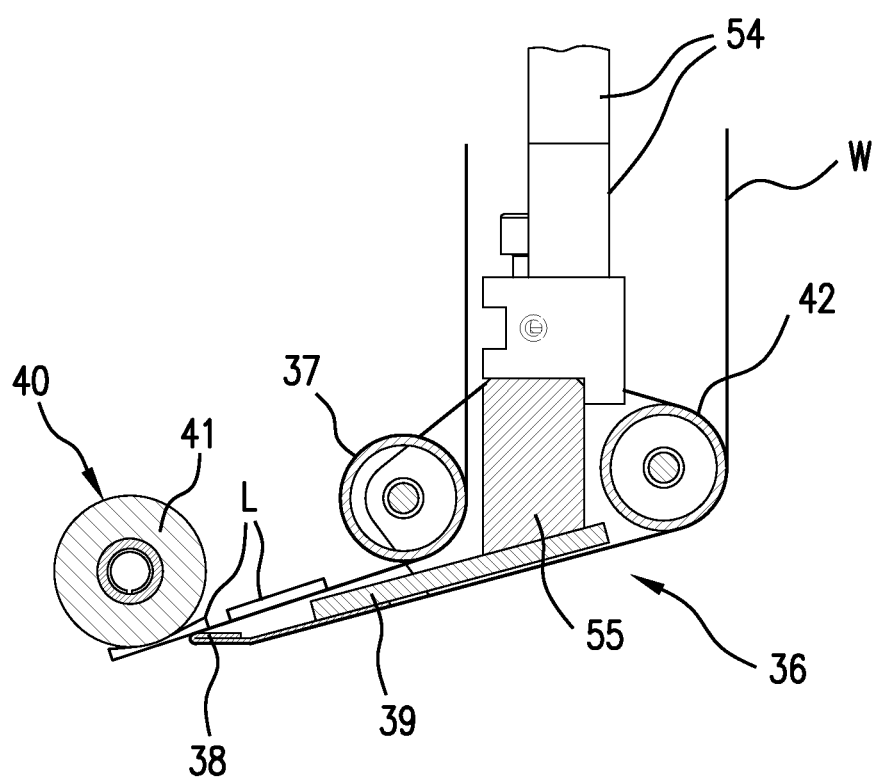
FIG. 2 is a fragmentary front elevational view, partly in section, of a dispensing and label applying mechanism of the machine shown in FIG. 1.

With reference to FIG. 1, the machine 25 is shown to have a frame or housing generally indicated 26 which can mount components such as a support arm or mounting arm generally indicated at 30, a label web tension control assembly generally indicated at 27, an applicator or dispenser assembly or module generally indicated at 28 and a rewind or rewind module generally indicated at 29. The assembly 27 is shown to be mounted on the support arm or mounting arm 30. The web W can pass from a roll R which may have a core then about a direction-changing roll 31 rotatably mounted on the arm 30 and from there about a roll 32 which is part of the assembly 27. The assembly 27 allows the web W to be paid out from the roll R under the proper tension and as such may be termed a tension control device. From the roll 32, the web W can pass about a direction-changing roll 33 and from there the web W can pass about a direction-changing roll 34. From there the web W passes about a driven feed roll 35. From there the web W can pass to a dispensing assembly or mechanism generally indicated at 36 and, in particular, about a direction-changing roll 37. The dispensing assembly 36 is better shown in FIG. 2 and may have a delaminator 38 (FIG. 2) in the form of a peel plate adhered to the bottom of a bracket 39. However, the delaminator 38 can be a peel roller instead (not shown). The dispensing mechanism 36 is fastened to a plate or frame 92 of the applicator module 28 by a screw 54' received in a threaded hole 102" (FIG. 6) in an insert or plug 102'. The plug 102' which can be made of steel is received in a hole 102. The dispensing mechanism 36 is detentable in any one of the holes 106. Accordingly, the mechanism 36 can be positioned at selected positions from the one shown in FIG. 1 up to 90 degrees clockwise from that position. After passing about the roll 37, the web W undergoes a sharp change in direction at the delaminator 38 where the labels L are peeled or delaminated from the web W. As labels L are successively delaminated they are presented in underlying label-applying relationship with respect to an applicator generally indicated at 40 which can be in the form of a roll 41. From the delaminator 38 the spent web W can pass about a direction-changing roll 42.

As seen in FIG. 1, the spent web W can next pass about and over a direction-changing roll 43, from there the web W can pass about and under a driven roll 44 and from there about and over a direction-changing roll 45. From there the web W can pass about and over a direction-changing roll 46.

A dancer 49 can include rolls 47 and 48 rotatably mounted on a dancer arm 49'. The web W passes from the roll 46 to and about the roll 47 and from about a roll 50. From there the web W passes about the roll 48 and from there the web W can pass about a roll 51 and from there the spent web W is wounding into a roll R'. The assembly 28 also includes a guide roll 52 and a spring-urged pressure roll 53. The rolls 52 and 53 are mounted on a manually engageable roll mounting assembly 115. The roll assembly 115 can pivot counterclockwise to a position where the rolls 52 and 53 are spaced from the driven roll 44 to facilitate threading of the web W.

It is noted that the roll 31 is on the support arm 30, the rolls 34, 35, 43, 44, 45, 46, 52 and 53 are on the applicator or dispenser assembly or module 28, the rolls 37 and 42 are on the dispenser mechanism 36 and the rolls 47, 48, 50 and 51 are on the rewind or rewind module 29. While this is the preferred arrangement to provide for effective advance of the web W from the supply roll R to the take-up roll R' preferably having a core other suitable locations for these rolls can be provided. It is noted that the driven roll 35 is upstream of the delaminator 38 and the driven roll 44 is downstream of the delaminator 38. The dispenser mechanism 36 includes a pair of rods 54 connected to a transverse supports 55 and 55'. The plate 39 is secured to the transverse support 55. The mechanism 36 is adjustable as a unit with respect to the assembly 28 to accommodate to different situations. The module 28 also includes a display 56.

Figure 3:
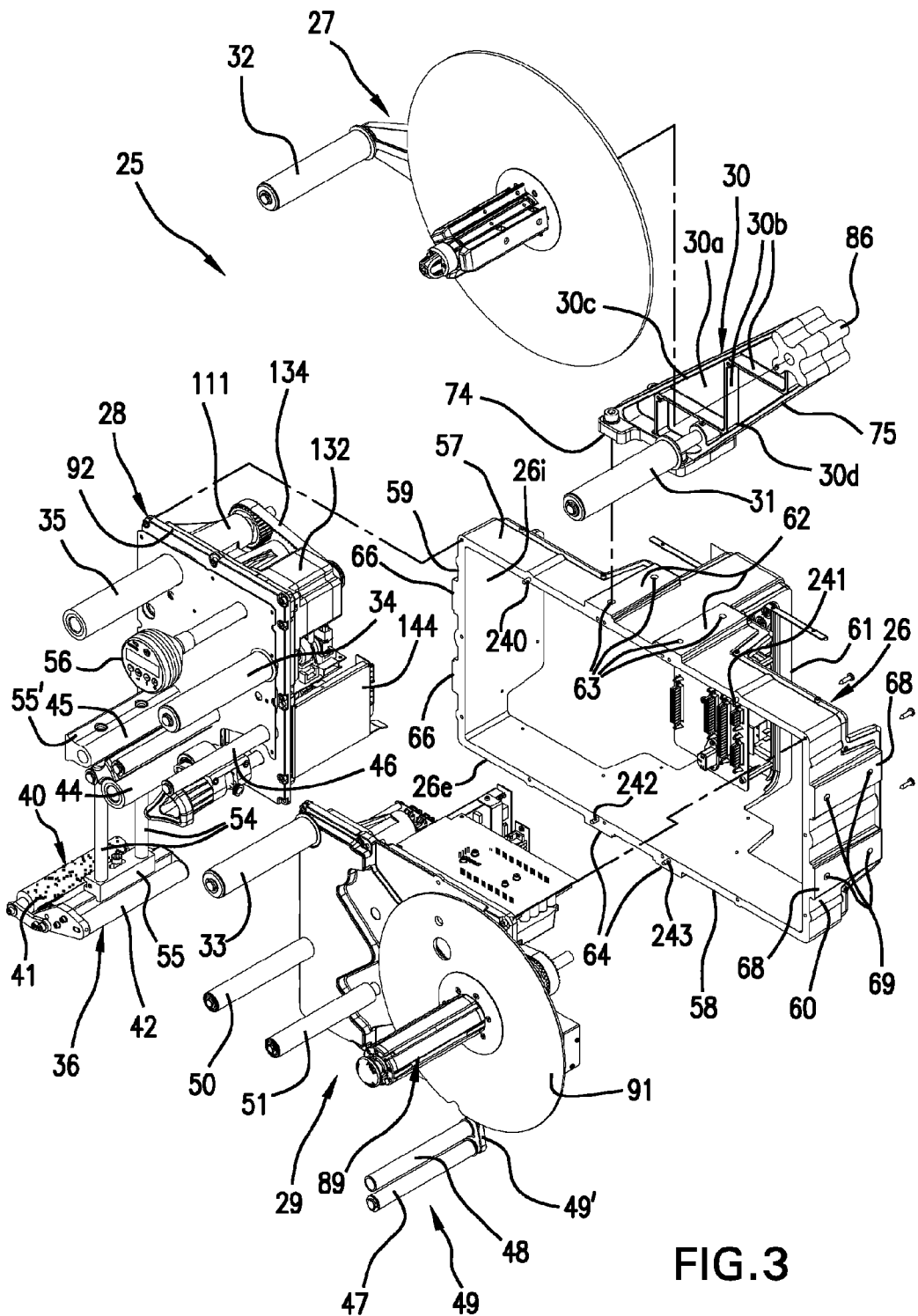
FIG. 3 is a partially exploded, pictorial view of the labeling machine showing a frame or housing, an applicator module, a rewind module, a support arm and a tension control mechanism mountable on the support arm in the one selected configuration.

With reference to FIG. 3, the frame or housing 26 is shown to be generally rectangular which can have sides 57 through 60. The sides 57 and 58 are shown to be horizontal and the sides 59 and 60 preferably integrally connected thereto are shown to be vertical. The sides 57 and 58 can preferably be longer than the sides 59 and 60 as illustrated. The frame 26 also has a rear side 61 with a U-shaped connector 61' bridging the sides 57 and 58 to add strength and rigidity. The connector 61' enables the connected sides 57 through 60 to be thinner and yet have the desired strength and rigidity. The entire frame 26 including its connector 61' can preferably be molded or cast in one piece. For example, the frame 26 can be a die casting and can be composed of aluminum. As shown in FIGS. 3, 11, 12 and 13 for example, the side 57 has a mounting station which can be comprised of a pair of spaced raised mounting pads 62 with threaded holes 63, the side 58 has a mounting station which can be comprised of a pair of spaced raised mounting pads 64 with threaded holes 65, the side 59 has a mounting station which can be comprised of a pair of spaced raised mounting pads 66 with threaded holes 67, the side 60 has a mounting station which can be comprised of a pair of spaced raised mounting pads 68 with threaded holes 69, and the side 61 has a mounting station which can be comprised of a pad 61p with threaded holes 61". The outer surfaces of the pads 62, the pads 64, the pads 66, the pads 68 and the pad 61p are preferably co-planar, flat and parallel to their respective sides 57 through 61.

As best shown in FIG. 13, the pads 62 have opposed abutments or stops that provide aligning or locating surfaces 70, the pads 64 have opposed abutments or stops that provide aligning or locating surfaces 71, the pads 66 have opposed abutments or stops that provide aligning or stop surfaces 72, and the pads 68 have opposed abutment or stops that provide aligning or locating surfaces 73. It is preferred that the aligning surfaces 70 though 73 are machined square with the frame 26.

Figure 14:
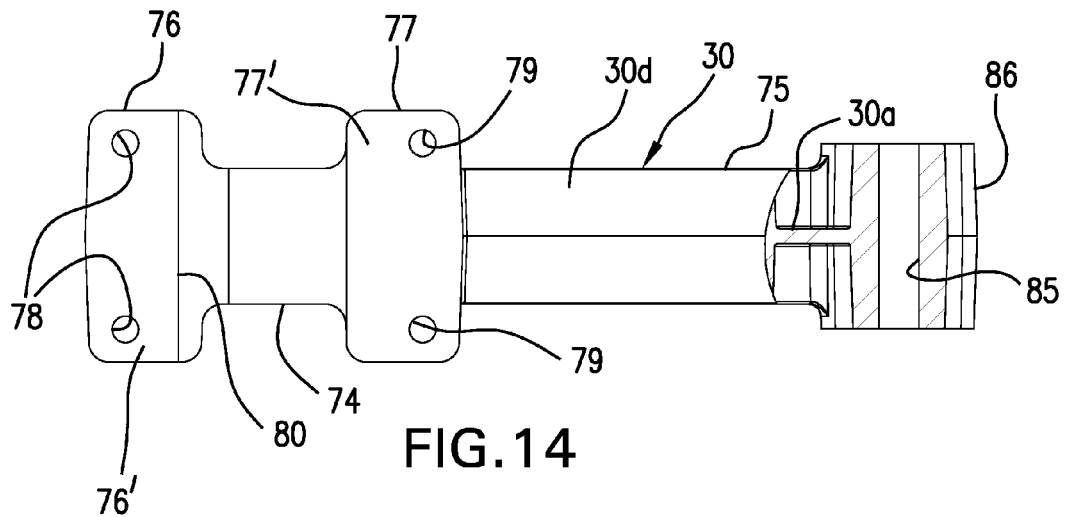
FIG. 14 is a partly sectional bottom plan view of the support arm.
Figure 15:
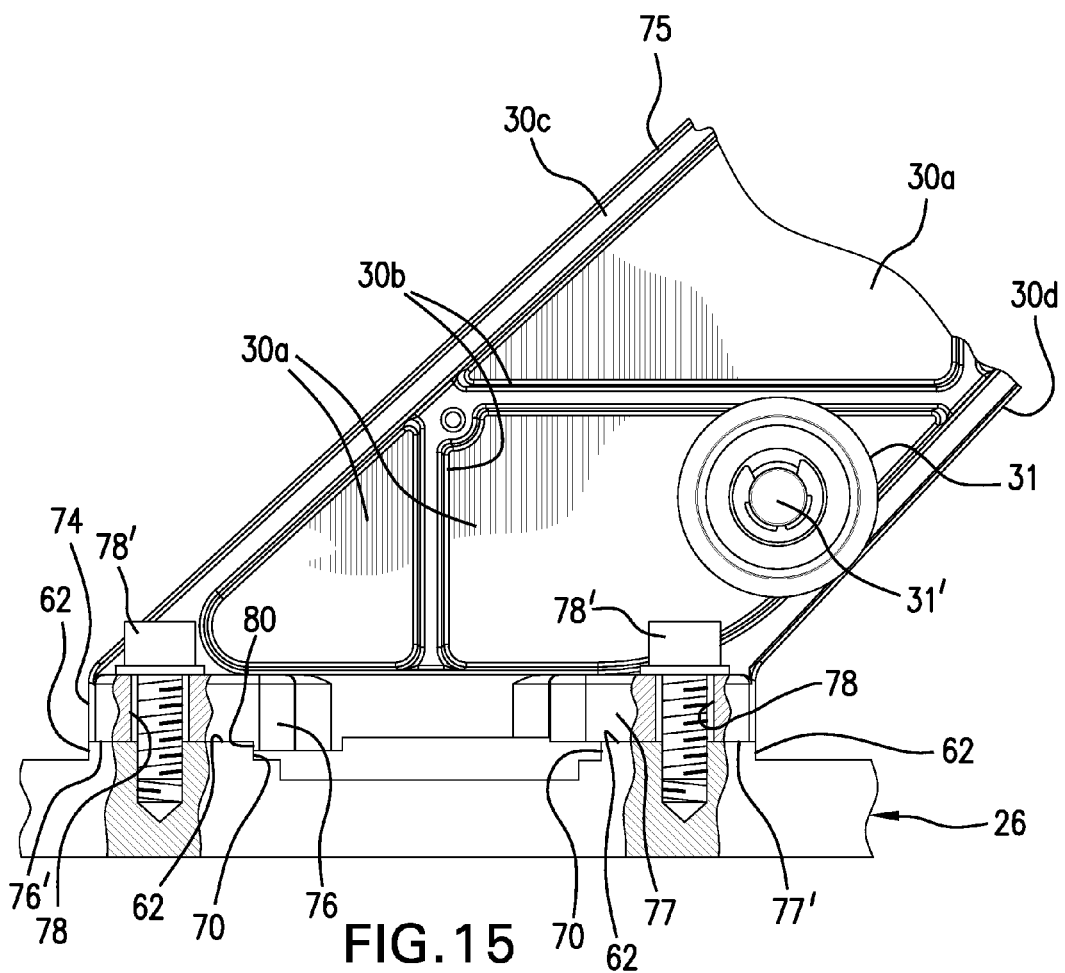
FIG. 15 is a fragmentary front elevational view of the frame and the support arm in the one selected configuration.
Figure 16:
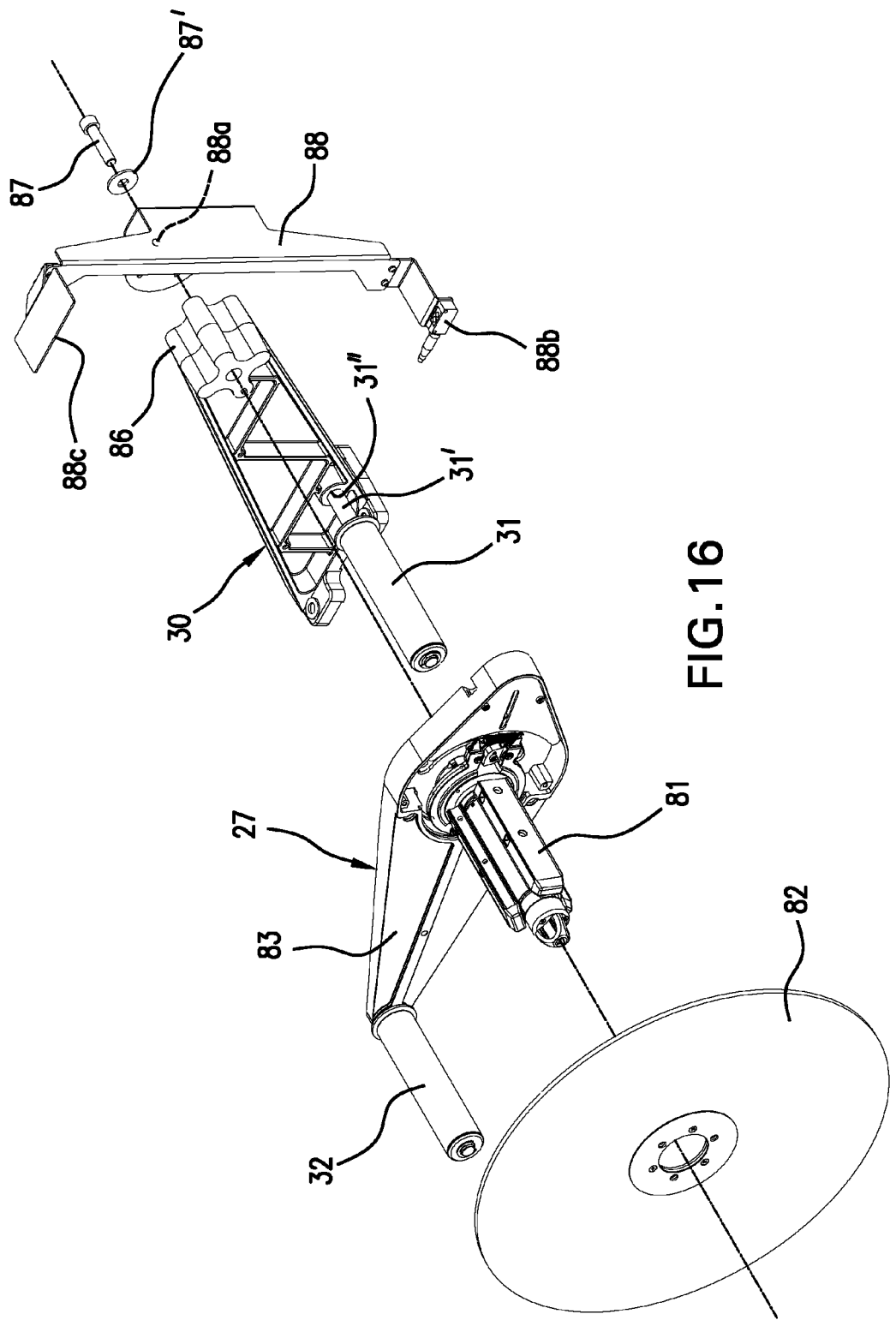
FIG. 16 is a partially exploded pictorial view showing the support arm and the tension control mechanism and sensing assembly which it mounts in the one selected configuration.
Figure 17:
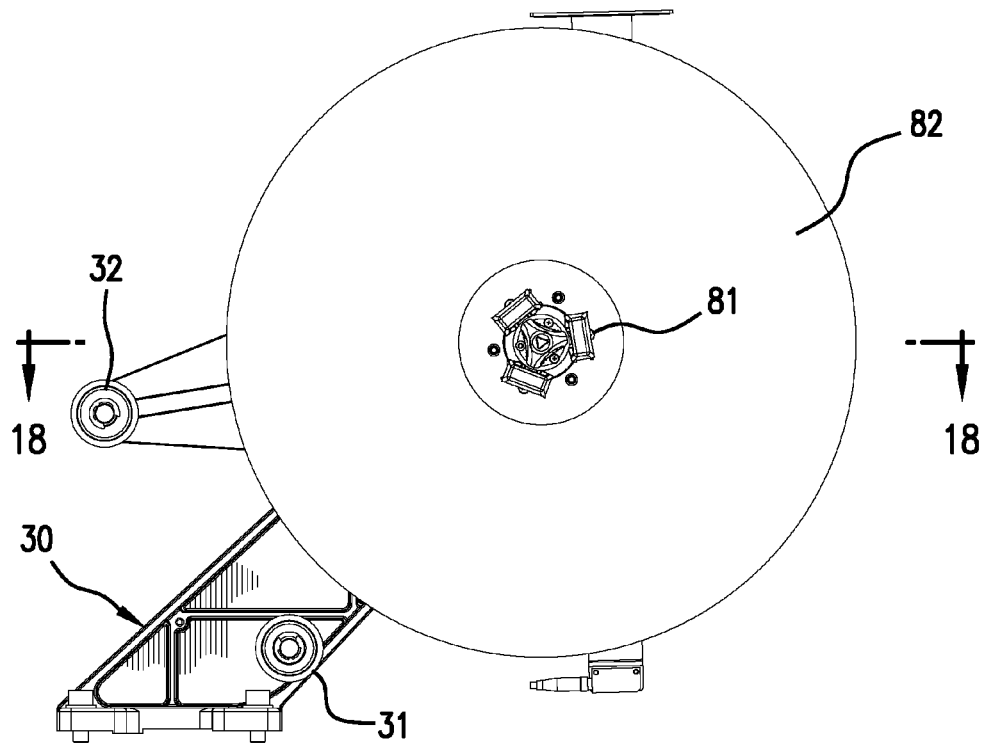
FIG. 17 is a front elevational assembled view of the support arm, the mechanism and the assembly shown in FIG. 16.

As shown in FIGS. 3, 14 and 15 for example, the support arm 30 has a base portion 74 and an arm portion 75. The arm portion 75 extends obliquely from the base portion 74. The base portion 74 has a pair of spaced raised mounting surfaces or pads 76 and 77. The pads 76 and 77 have flat, co-planar surfaces 76' and 77'. The pad 76 can have through-holes 78 and the pad 77 can have through holes 79. The pad 76 can have an abutment or aligning or locating surface 80 as best shown in FIGS. 14 and 15. FIG. 15 shows that the abutment or aligning or locating surface 80 is against one of the aligning surfaces 70. Bolts 78' pass through holes 78 and 79 with enough clearance so that the abutment 80 can be brought into contact with the one aligning surface 70, whereupon the bolts 78' can be tightened to secure or clamp the base portion 74 of the support arm 30 to the frame 26 in the aligned position. The holes 78 are large enough and provide clearance with respect to the bolts 78' so that the abutment 80 in contact with the surface 70 assures that the arm 30 is square with respect to the frame. As shown, the bolts 78' are threadably received in the frame 26. While it is preferred to mold or cast the arm 30 such as by die casting the arm from a suitable material such as aluminum, it is also preferred to machine the abutment face following casting so that it is square with the frame 26 and so that when abutment 80 contacts any one of surfaces 70, 71, 72 or 73, the arm 30 is square with the frame 26. When the arm 30 is square with the frame 26, the arm 30 and the frame 26 are also square with parallel rolls 32, 33, 34, 35, 37, 42, 43, 44, 45, 46, 47, 48, 50 and 51, the tension control assembly 27 and the rewind 29. Therefore, the web W will track well through the machine 25.

The tension control assembly 27 shown in FIGS. 1, 3 and 16 through 21 is essentially the same as the tension control assembly depicted in U.S. patent application Ser. No. 11/323,326, Publication No. US2007/0131814 incorporated herein by reference and to which reference may be made. Briefly, the assembly 27 includes a hub 81 on which the label supply roll R can be mounted. A freely-rotatable guide disc 82 defines an edge against which the roll R can be positioned. The disc 82 may be comprised of plastics material. As shown in FIG. 18, the assembly also includes the roll 32. Further details are disclosed in Publication No. US2007/0131814. The roll 32 and the hub 81 are assembled onto a kite-shaped or diamond-shaped housing 83. A shaft 84 extends into and through the housing 83 and forms part of the hub 81. As shown, the shaft 84 extends through a bore 85 in an enlarged portion 86 of the support arm 30. A bolt 87 passes through a washer 87' and is threadably received by the shaft 84. The bolt 87 also passes through a hole 88a in a bracket 88 which mounts a sensor 88b. The sensor 88b cooperates with a mirror 88c to signal when the roll R is nearly exhausted. The bracket 88 is non-rotatably secured to the arm 30 by screws (not shown). The support arm 30 has a central web 30a and has ribs 30b extending at right angles to each other and to the base portion 74. Flanges 30c and 30d are jointed to the web 30a and the ribs 30b.

The rewind 29 includes a roll-mounting assembly 89 shown in FIGS. 1, 3, 7 and 19 through 21. With reference to FIG. 3 for example, the roll mounting assembly 89 includes a disc 91. The mounting assembly 89 mounts the spent web roll R' and the side of the roll R' contacts the disc 91. The face of the disc 82 that contacts the roll R and the face of the disc 91 that contacts the roll R' are in the same plane. It is to be noted that the rolls 31 through 34 are flanged and the face sides of their flanges guide one edge of the web, thereby facilitating tracking of the web W. The hub 89 provides for ease of clamping and unclamping the roll R'. Publication No. US2007/0125899 discloses the details of the hub 89.

Figure 5:
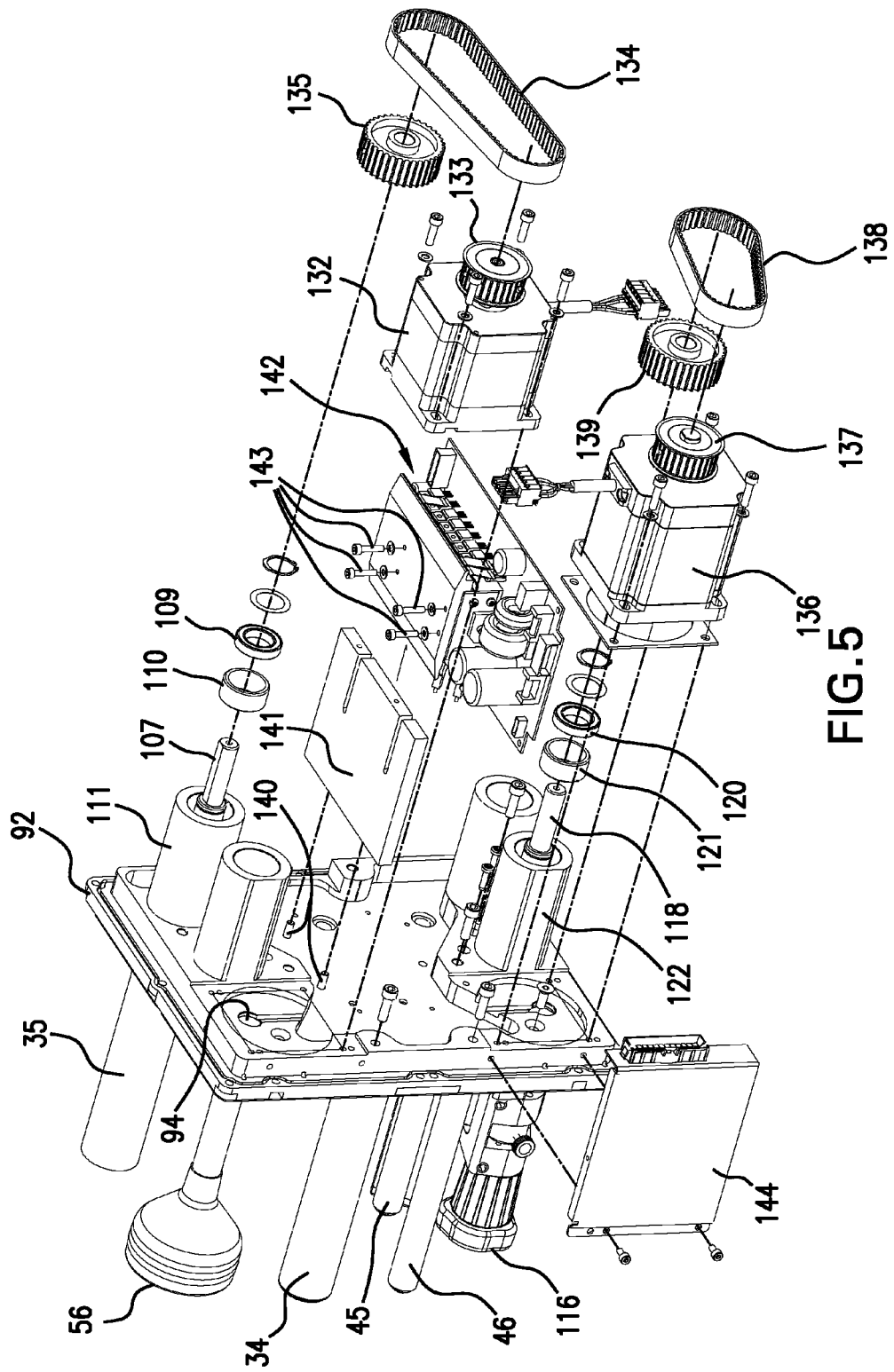
FIG. 5 is a pictorial view showing the rear of the applicator module exploded away.
Figure 6:
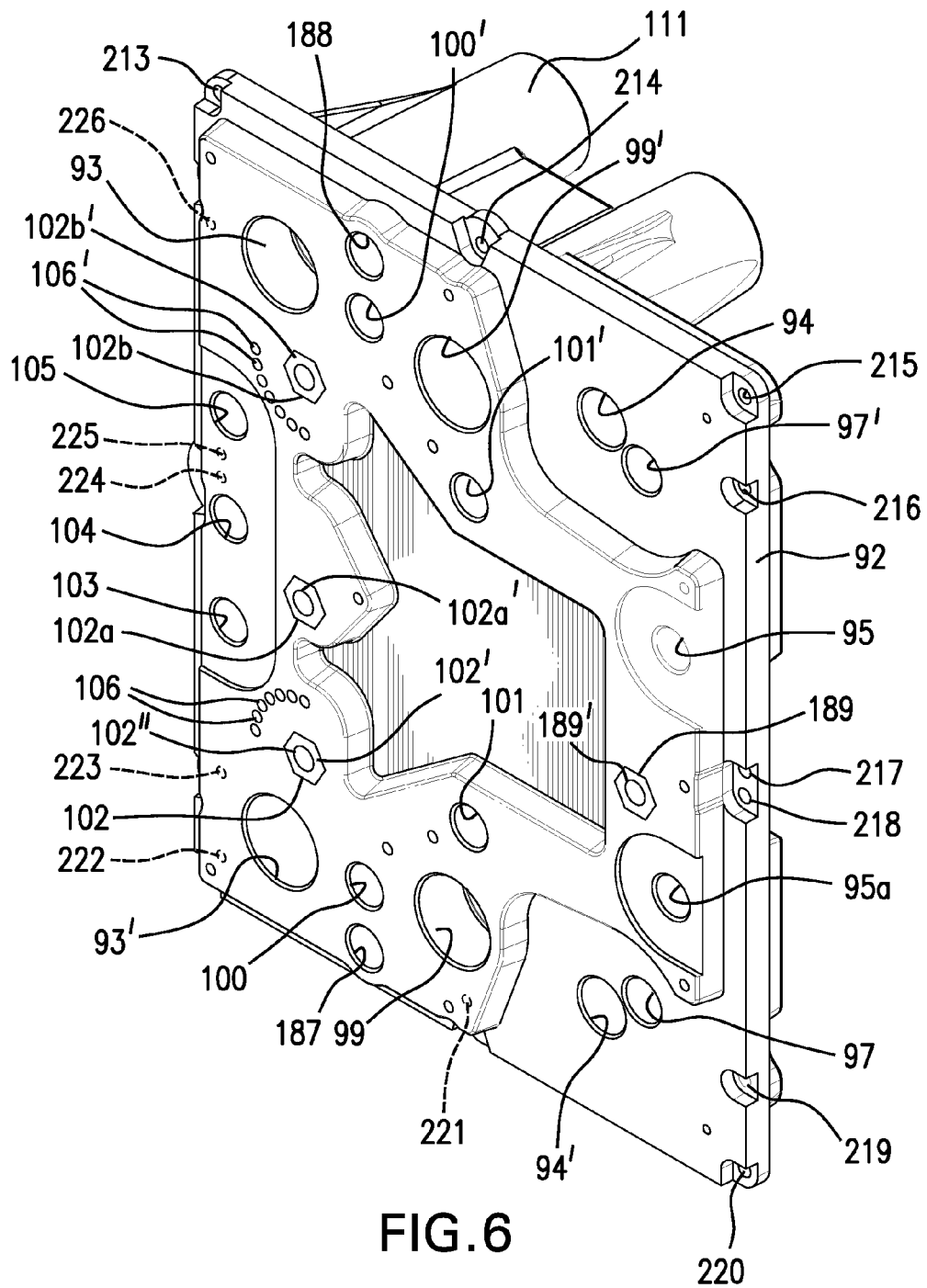
FIG. 6 is a pictorial view of the frame of the applicator module as viewed from the front.

With reference to FIG. 6, there is shown a frame or plate 92 of the applicator module 28. The plate 92 is received against an edge 26e of the frame 26 and portions of the plate 92 are received in internal or interior space 26i within the frame 26. The plate 92 can be molded or cast and is preferably a die casting comprised of aluminum. The plate 92 has a location or hole 93 for the driven roll 35. The plate 92 has a location or hole 94 for the display 56, a location or hole 95 for the roll 34, a location or hole 95a for the roll 46, a location or hole 97 for a shaft 114 (FIG. 4), a location or hole 99 for the driven roll 44, a location or hole 100 for the roll 43 and a location or hole 101 for the roll 45. The location 102 can receive a threaded plug 102'. Locations 102a and 102b can receive such threaded plugs 102a' and 102b'. Locations 103, 104 and 105 can optionally be used to mount one, two or three direction-changing rollers (not shown). A plurality or detent recesses 106 arranged in an arc can be used to hold the dispensing mechanism 36 in different positions. Locations 93 through 95, 97, 99, 100, 101 and 102 and the recesses 106 are used in the machine configurations according to FIGS. 1 through 18 and 20. More particularly, with reference to FIG. 4 and 5, the location 93 receives a shaft 107 of the driven roll 35. The location 93 is provided by an integral tubular portion 111 of the frame 92. The tubular portion 111 enables two bearings 109 (one of which is shown) to be widely spaced to receive and support the shaft 107.

The location 95 mounts a stationary shaft 112 (FIG. 4) which rotatably mounts the roll 34. The location 95a mounts a stationary shaft 113 which rotatably mounts the roll 46. The location 97 mounts a stationary shaft 114 which pivotally mounts the roll assembly 115 having a handle 116. The roll assembly 115 rotatably mounts the rolls 52 and 53. The location 100 mounts a stationary shaft 117 which rotatably mounts the roll 43. The location 101 mounts a stationary shaft 118 which rotatably mounts the roll 45. The driven roll 44 has a shaft 118 rotatably mounted in the hole 99. The frame 92 has a tubular portion 122 which enables bearings 120 (one of which is shown) to be spaced by and straddle a spacer 121. The spacer 121 and the bearings 120 are received within the tubular portion 122.

Figure 4:
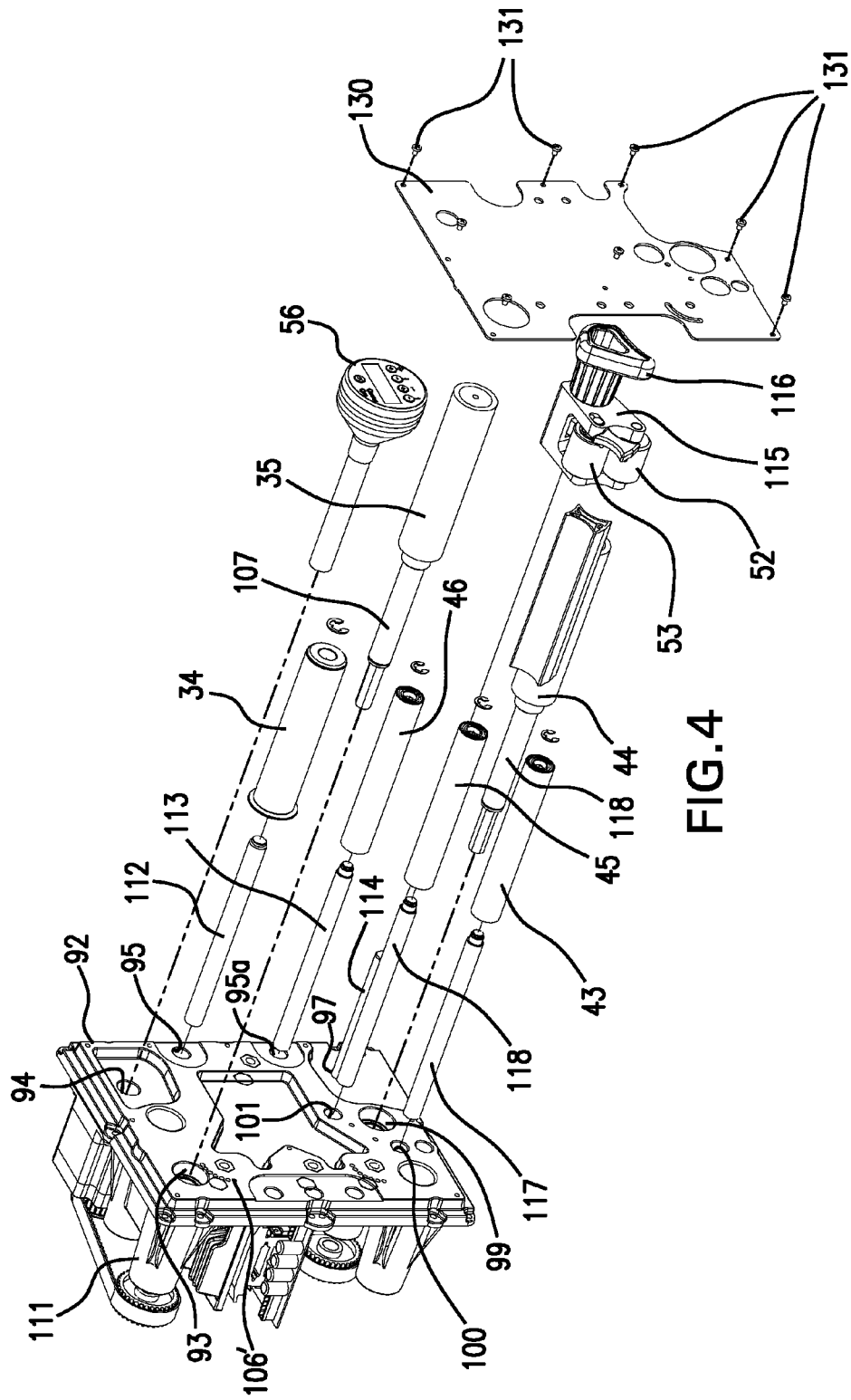
FIG. 4 is a pictorial view showing the front of an applicator module exploded away.

FIGS. 1 and 4 show a cover plate 130 which is secured to the frame 92 by screws 131 covers unused holes in the plate 92. As seen in FIG. 5, a motor 132 is bolted to the rear side of the plate 92 and drives a toothed wheel 133. A flexible toothed belt 134 passes about the toothed wheel 133 and a toothed wheel 135 mounted on and secured to the shaft 107. A motor 136 is bolted to the rear side of the plate 92 and drives a toothed wheel 137. A flexible toothed belt 138 passes about the toothed wheel 137 and a toothed wheel 139 mounted on and secured to the shaft 118. The motors 132 and 136 can be stepping motors. Operation of the motor 132 drives the feed roll 35 counterclockwise and operation of the motor 136 drives the feed roll 44 counterclockwise as viewed in FIG. 1. Pins 140 on the plate 92 mount a shelf 141 to which electronic components generally indicated at 142 are mounted by screws 143. The plate 92 also mounts electronic components 144 as shown in FIG. 3.

Figure 7:
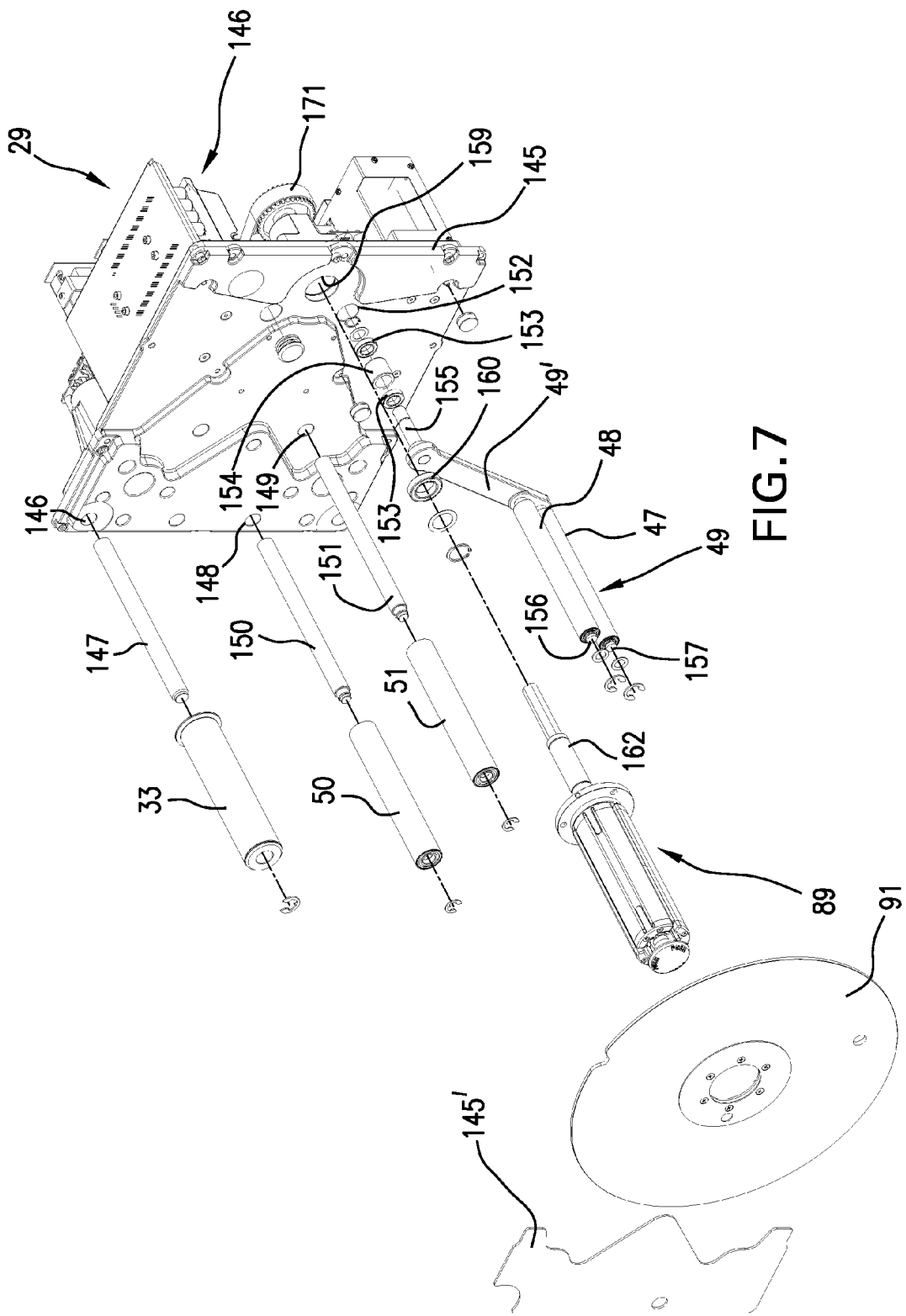
FIG. 7 is an exploded pictorial view of the rewind module as viewed generally from the front.
Figure 9:
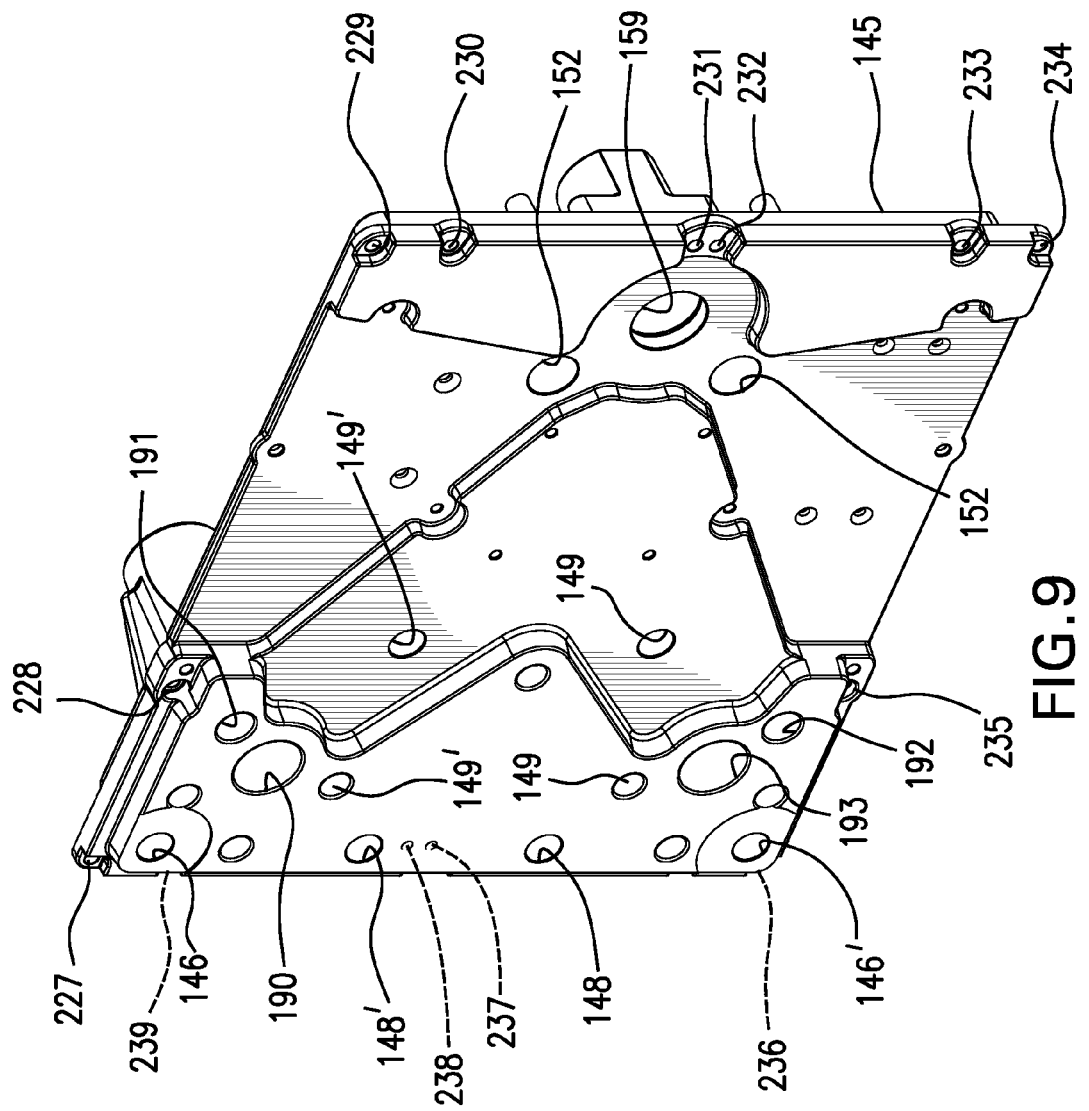
FIG. 9 is a pictorial view of the frame of the rewind module as viewed generally from the front.
Figure 10:
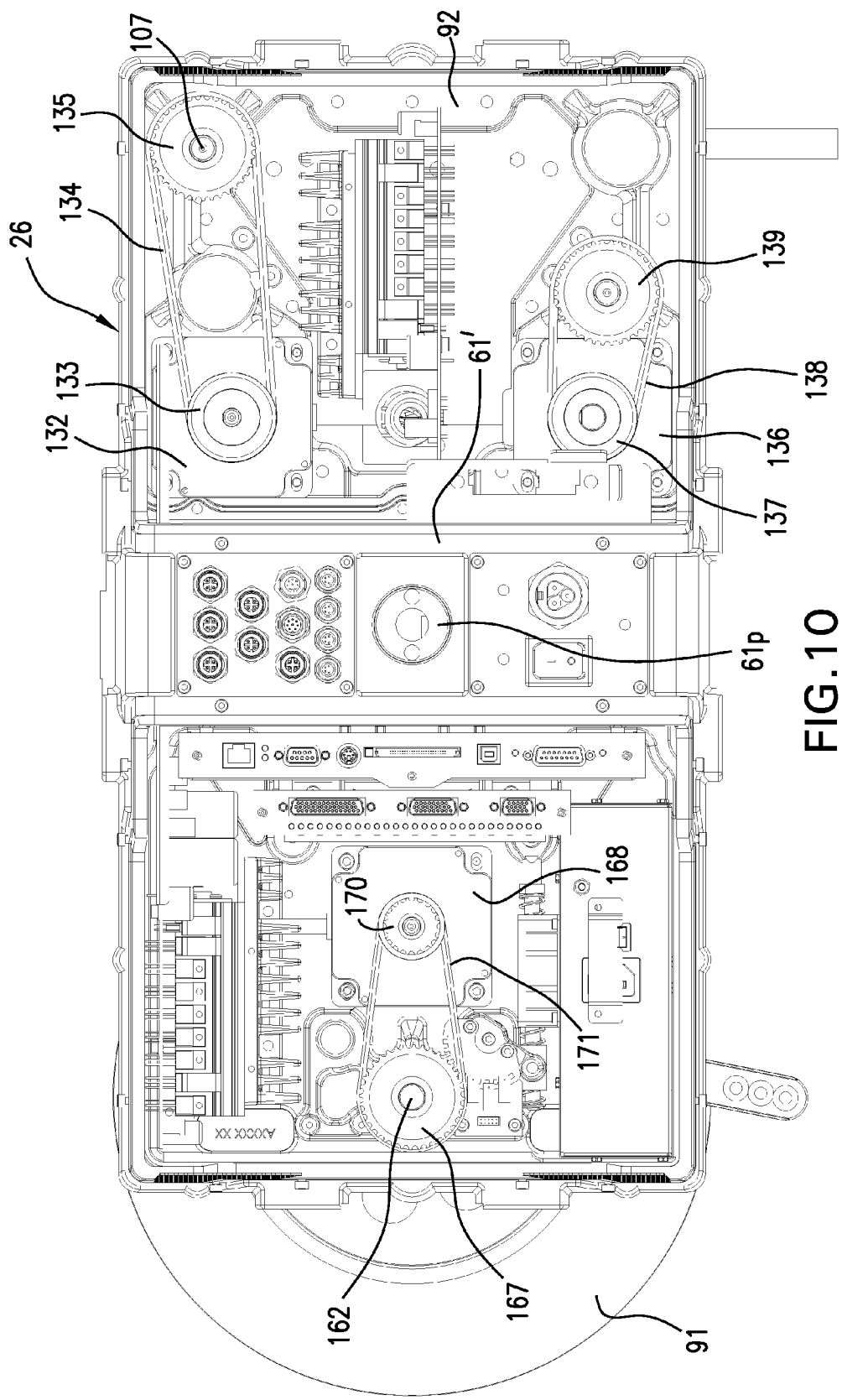
FIG. 10 is a rear elevational partly broken away view of the labeling machine in the one selected configuration.
Figure 12:
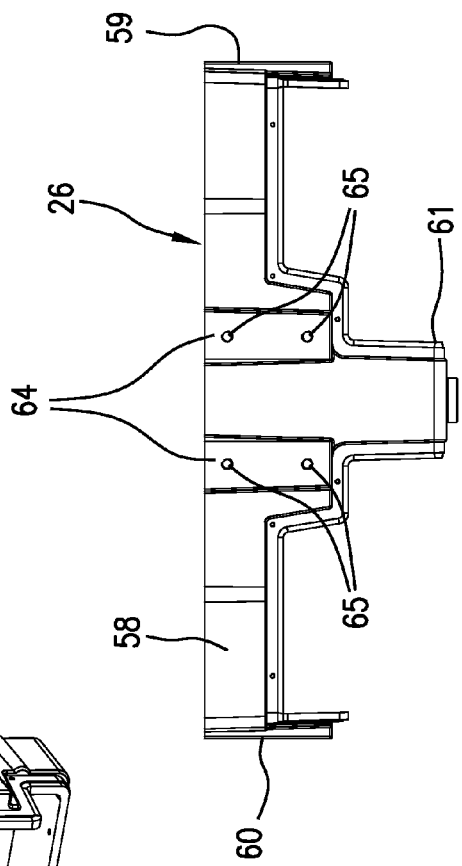
FIG. 12 is a bottom plan view of the frame shown in FIG. 11 for example.
Figure 11:
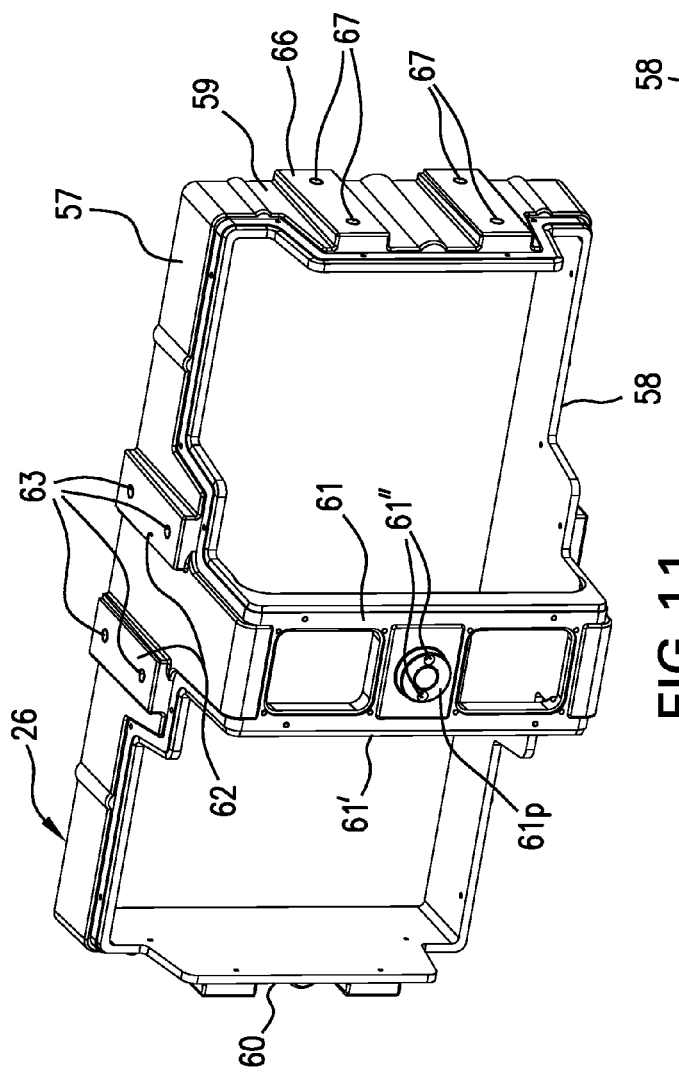
FIG. 11 is a pictorial view of the machine frame as viewed generally from the rear.

FIG. 7 shows the front side of a frame or plate 145 of the rewind module 29. There is a cover plate 145' to cover unused holes. The plate 145 is received against the edge 26e of the frame 26 and portions of the plate 145 are received in the internal or interior space 26i. The plate 145 itself is shown in FIG. 9. The plate 145 has a location or hole 146 that mounts a shaft 147 which in turn rotatably mounts the direction-changing roll 33. The plate 145 also has locations or holes 148 and 149 for mounting respective shafts 150 and 151. The shafts 150 and 151 rotatably mount respective direction-changing rolls 50 and 51. The plate 145 also has a location or hole 152 to receive ball bearings 153 and a spacer sleeve 154. The ball bearings 153 pivotally mount a shaft 155 secured to one end portion of the dancer arm 49'. Shafts 156 and 157 are secured to the other end portion of the dancer arm 49'. The plate 145 has a location or hole 159 to mount spaced ball bearings 160 (one of which is shown). The bearings 160 rotatably mount a shaft 162 of the mounting assembly 89. The plate 145 also mounts electronic components 146.

Figure 8:
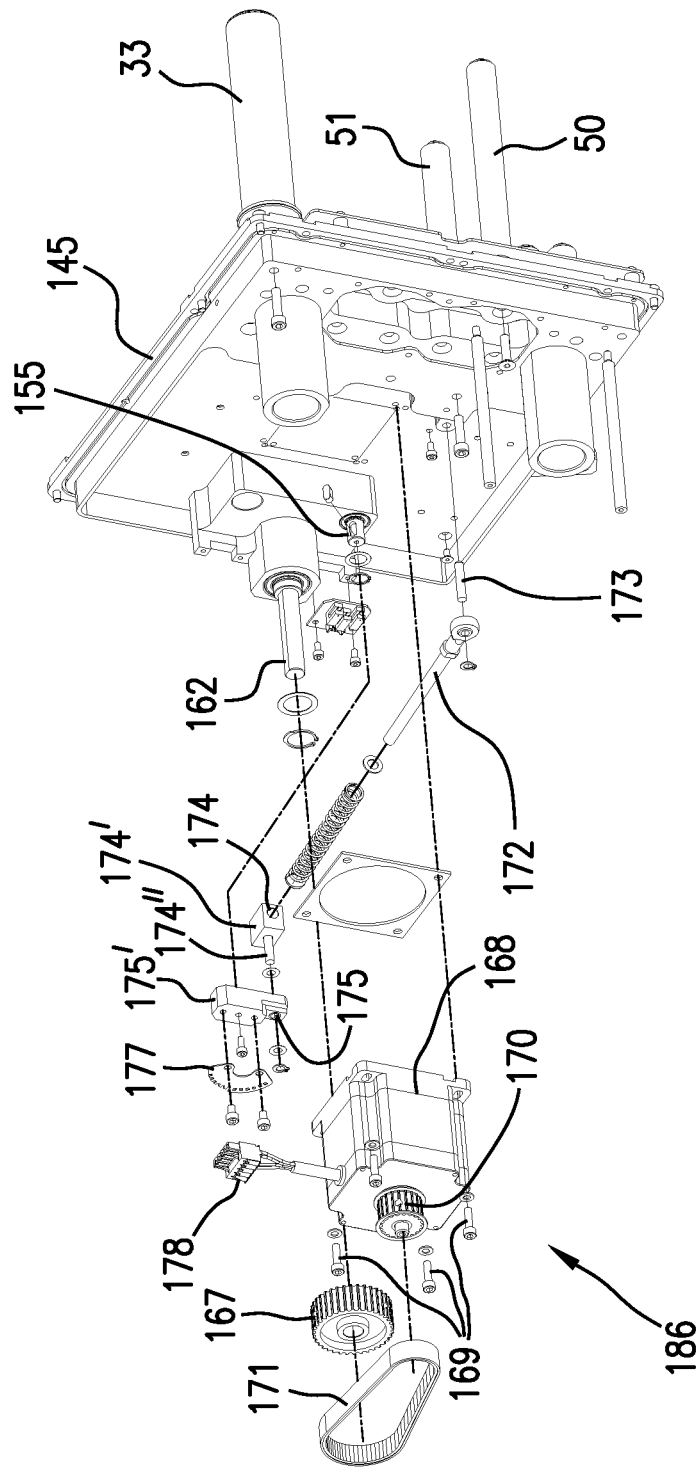
FIG. 8 is a partially exploded pictorial view of the rewind module as viewed generally from the rear.

With reference to FIG. 8, there is a toothed wheel 167 secured to the shaft 162. A motor 168 which may be a stepping motor is mounted to the rear side of the frame or plate 145 by bolts 169. The motor 168 mounts a toothed wheel 170. A flexible toothed belt 117 passes about the tooth wheels 167 and 170. When the motor 168 operates, the toothed wheel 170 drives the belt 171 which drives the toothed wheel 167 and in turn the shaft 162 to affect winding of the spent web onto the roll mounting assembly 89.

The dancer 49 (FIG. 7) includes a rod 172 pivotally mounted on a pin 173 secured to the plate 145. The rod 172 fits through a through-hole 174 of a block 174' having a mounting pin 174". The pin 174" is received in a hole 175 of a pivotal mounting member 175'. A screw 176 passes through the member 175' and secures the member 175' against rotation to the end of the dancer shaft 155. A graduated plate 177 secured to the member 175' moves in an arc as the shaft 155 changes position in dependence on either slack or tautness of the spent web W. The position of the graduated plate 177 can be sensed by a sensor 178 to control the motor 168 to apply either more or less torque to the shaft 162.

FIGS. 1 through 18 show and the foregoing portion of this detailed description depicts one configuration of the machine 25, while FIG. 19 shows the machine assembled with the same components differently arranged to provide a different configuration, namely, a right-hand configuration. Since the same components are used the same reference characters are used to designate the same components. It is apparent that the position of the frame 26 is the same. In assembling the machine 25 according to the configuration shown in FIG. 19, the applicator or dispenser assembly 28 is positioned at the right-hand portion of the frame 26 and the rewind assembly 29 is positioned at the left-hand portion of the frame 26, just the opposite from the configuration of FIGS. 1 through 18. It is seen that the frame 26 is adaptable to receiving and mounting the applicator assembly 28 and the rewind assembly in two different positions. Since the applicator assembly 28 is in a different position in FIG. 19, the dispensing mechanism 36, the rolls 34, 35, 43, 44, 45 and 46 and the display 56 are also assembled differently. In particular the frame 92 of the applicator assembly 28 has various additional locations in which the dispenser mechanism 36, the rolls 34, 35, 43, 44, 45 and 46 and the display 56 are mounted to accommodate the FIG. 19 arrangement. The frame 94 is oriented so that the front of the frame 94 in FIG. 19 remains the front of the frame 94 in FIG. 1, except that in the FIG. 19 version the frame 145 is rotated 180 degrees from the position shown in FIG. 6 for example. Accordingly, a location 93' is used to mount the shaft 107 of the driven roll 35, a location 94' is used to mount the display 56, the location 95a is used to mount the shaft 112 for the roll 34, the location 95 is used to mount the shaft 113 of the roll 46, a location 99' is used to mount the shaft 118 of the driven roll 34, a location 100' is used to mount the shaft 117 for the roll 34, and a location 101' is used to mount the shaft 118 for the roll 45.

Other locations such as indicated at 187 and 188 can be used for other models of the machine 25 having different components such as direction-changing rolls or guides. Location 189 can receive a threaded plug 189' such as the plug 102'.

The support arm 30 is assembled onto the frame 26 by bringing the abutment 80 against the right-hand surface 70 (FIG. 15), and thereupon the bolts 78' are used to secure the arm 30 to the frame 26 in the aligned position. Accordingly, the support arm 30 will extend upwardly and to the left as viewed in FIG. 19, in contrast to the embodiment of FIGS. 1 through 18 wherein the support arm 30 extends upwardly and to the right. Since the rewind assembly 29 is in a different position in FIG. 19, the rolls 33, 50 and 51 and the roll mounting assembly 89 are also assembled differently. In particular, the frame or plate 145 of the rewind assembly 29 has different locations in which the dispenser mechanism 36, the roll 33, 50 and 51 and the roll mounting assembly 89 are mounted to accommodate the FIG. 19 configuration. The frame 145 is positioned so that the front of the frame 145 in FIG. 19 corresponds to the orientation of the front of the frame 145 in FIGS. 1 and 9, except that in the FIG. 19 configuration the frame 145 is rotated 180 degrees. Accordingly, a location 146' is used to mount the roll 33, a location 148' is used to mount the roll 50, a location 149' is used to mount the roll 51, the location 159 is used to mount the roll mounting assembly 89, and a location 152' is used to mount the shaft 155 of the dancer assembly. Other locations such as indicated at 190, 191, 192 and 193 can be used for other models of the machine 25 having different components such as direction-changing rolls or guides. The dispenser mechanism 36 is secured to the plate 92 by a screw 54" threadably received by a threaded plug 102a' in a hole 102a.

With reference to the configuration depicted in FIG. 20, the applicator assembly 28 and the rewind assembly 29 are in the same positions as in the configuration of FIG. 1, except for the position of the support arm 30 and the use of additional direction-changing rolls 194 and 195. The rolls 194 and 195 are mounted on respective shafts 194' and 195' received at respective locations 105 and 103 (FIG. 6). As seen in FIG. 20, the web W passes from the roll 35 about the rolls 194 and 37 about the delaminator 38, about the rolls 42 and 195, over the roll 43, and so on. As is apparent from FIG. 20, the configuration of FIG. 20 has a low profile, that is, a long and narrow profile which is very advantageous where there are confined label applying situations such as a high speed rotary bottling machine (not shown) where various labeling machines such as the labeling machine 25 are disposed close to each other. As seen in FIG. 20, the support arm 30 is secured to the short, vertical, right side 60 of the frame 26 and the abutment face 80 (FIG. 15) of the arm 30 is against the lower surface 73 (FIG. 13) of the frame 26. A connector or link 196 secured to the support arm 30 rotatably mounts a direction-changing roll 32'.

FIG. 20 also shows the dispenser mechanism 36 with longer rods 54a than in FIGS. 1 and 3 for example. Threaded plugs 102a' and 189' are received in holes 102a and 189 (FIG. 6). Screws 54a' and 54a" are received in plugs 102a' and 189'.

With reference to the configuration depicted in FIG. 21, the applicator assembly 28 and the rewind assembly 29 are in the positions as in the configuration of FIG. 19, except for the position of the support 30 and the positions of the dispensing assembly 36 and the roll 31'. The configuration of FIG. 21 affords a low profile as does the configuration of FIG. 20, but the configuration of FIG. 21 is in a right-hand arrangement.

It is noted from the foregoing configurations of the machine 25 that the frame 26 can receive and securely hold the applicator frame 92 or the rewind frame 145 in different positions as seen for example in FIGS. 1 and 20 on the one hand and in FIGS. 19 and 21 on the other hand. As depicted in the various figures including FIG. 13, the frame 26 has pairs of threaded holes 200 and 201 and outboard threaded holes 203 and 204 at side 57, pairs of threaded holes 205 and 206 and outboard threaded holes 207 and 208 at the side 58, threaded holes 209 at the side 59, threaded holes 210 at the side 60, a threaded hole 211 at the junction of the sides 57 and 59, and a threaded hole 212 at the junction of the sides 57 and 60. With reference to FIG. 6, the frame 92 has threaded holes 213 through 226. With reference to FIG. 9, the frame 145 has threaded holes 227 through 239. Holes 203 and 204 in the frame 26 mount locating pins 240 and 241. One of each of the holes 205 and 206 mount locating pins 242 and 243 (FIG. 3). The pin 240 and 242 can locate and mount either the frame 92 or the frame 145, and the pins 241 and 243 can locate and mount either the frame 92 or the frame 145. Also fasteners (not shown) can pass through the respective holes the frames 92 and 145 and can be threadably received in the corresponding holes in the frame 26. The holes in the frames 26, 92 and 145 are so arranged that the frames 92 and 145 can be oriented in the FIG. 1 or the FIG. 19 orientation. For example, for the frame 92 (FIG. 6), the hole 213 (FIG. 6) can align with the hole 211 (FIG. 13) while the hole 200 (FIG. 6) aligns with the pin 242. For example, for the frame 145 (FIG. 9) has a hole 233 which can align with a hole 209 in the frame 26 and the frame 145 has a hole 227 which can align with the right hole 200 of the frame 26 (FIG. 13). When the plate 92 and the plate 145 are switched as in the version shown in FIG. 19, the holes in the frames 92 and 145 align with the holes and pins 24 through 243 of the frame 26. Accordingly, the frame or housing 26 can house both the applicator assembly 28 and 29 in either of their orientations. The dispenser mechanism 36 is held in place like the dispenser mechanism 36 in FIG. 20.

If desired the frame 26 can receive a standard commercially available print engine (not shown). Such print engines are typically of the same dimensions and have the same locations or holes to mount the print engine, and the print engine can be secured in one or more of holes 201 through 211. Substitution of a print engine for the assembly 27 would enable the assembly 29 to be used in the position shown in FIG. 1 for example to enable the labels L to be printed and applied and for the spent web to be rewound.

The frame 26 can be mounted on suitable uprights or other structures using any side 27 through 61 which is not occupied by a component such as a support arm 30 and/or a tension control device such as the device 27.

Other embodiments and modifications of the invention will suggest themselves to those skilled in the art, and all such of these as come within the spirit of this invention are included within its scope as best defined by the appended claims.

I claim:

1. A labeling machine, comprising:
   a housing defining a space capable of mounting at least one module on at least two different external mounting stations, and
   an arm having an arm portion capable of holding a label supply roll and having a base portion, the arm portion being oblique to the base portion, one of the housing and the base portion having at least two first locating surfaces that are spaced apart from one another and the other of the housing and the base portion having at least one second locating surface selectively cooperable with either one of the first locating surfaces such that the base may be mounted to the housing at any one of the different mounting stations on the housing in either a first orientation or a second orientation which is different than the first orientation, wherein the arm portion extends away from the housing in a first direction when the base is mounted to the housing in the first orientation and the arm portion extends away from the housing in a second direction when the base is mounted to the housing in the second orientation, said second direction being different than the first direction.

2. The labeling machine as defined in claim 1, wherein the housing has spaced exterior flat first surfaces and the base portion has spaced flat second surfaces, wherein the base portion and the housing are capable of being secured with their first and second flat surfaces in contact with each other.

3. The labeling machine as defined in claim 1, including a label applicator module mounted in the space.

4. The labeling machine as defined in claim 1, including a label applicator module and a rewind module mounted in the space.

5. The labeling machine as defined in claim 1, wherein the arm extends obliquely with respect to the housing.

6. The labeling machine as defined in claim 1, wherein the housing is generally a rectangular shaped box and has an external mounting station on four sides thereof.

7. The labeling machine as defined in claim 1, wherein the housing has a mounting station on each of at least two sides.

8. The labeling machine as defined in claim 1, wherein each mounting station includes at least one aligning surface and the arm includes a cooperable aligning surface.

9. A labeling machine, comprising:

an arm for mounting a label roll, the arm including an arm portion and a base portion extending obliquely with respect to each other, wherein the base portion includes at least one mounting surface and at least one aligning surface which is disposed at an angle with respect to the mounting surface, said aligning surface abutting a mated surface of another part of the labeling machine to align the arm with respect to the other part.

10. The labeling machine as defined in claim 9, wherein the arm is of one-piece molded construction.

11. The labeling machine as defined in claim 9, wherein the base portion has two mounting surfaces disposed on opposite sides of the aligning surface.

12. The labeling machine as defined in claim 9, including a web guide mounted on the arm.

13. The labeling machine as defined in claim 9, wherein the at least one mounting surface and the aligning surface form a substantially right angle with respect to one another.

\* \* \* \* \*